(12) United States Patent
Park et al.

(10) Patent No.: US 9,548,478 B2
(45) Date of Patent: Jan. 17, 2017

(54) MIDDLE OR LARGE-SIZED BATTERY MODULE EMPLOYING IMPACT-ABSORBING MEMBER

(75) Inventors: Seung Yeob Park, Daejeon (KR); JaeSeong Yeo, Daejeon (KR); Jong Hwan Park, Daegu (KR); Youngjoon Shin, Daejeon (KR)

(73) Assignee: LG Chem, Ltd. (KR)

( * ) Notice: Subject to any disclaimer, the term of this patent is extended or adjusted under 35 U.S.C. 154(b) by 1188 days.

(21) Appl. No.: 12/225,196

(22) PCT Filed: Mar. 9, 2007

(86) PCT No.: PCT/KR2007/001184
§ 371 (c)(1),
(2), (4) Date: May 4, 2009

(87) PCT Pub. No.: WO2007/105889
PCT Pub. Date: Sep. 20, 2007

(65) Prior Publication Data
US 2009/0311581 A1 Dec. 17, 2009

(30) Foreign Application Priority Data

Mar. 13, 2006 (KR) .................. 10-2006-0022923

(51) Int. Cl.
*H01M 2/10* (2006.01)
*H01M 10/05* (2010.01)
(Continued)

(52) U.S. Cl.
CPC ............. *H01M 2/10* (2013.01); *H01M 2/0237* (2013.01); *H01M 2/0262* (2013.01);
(Continued)

(58) Field of Classification Search
CPC ... H01M 2/02–2/0217; H01M 2/0237–2/0247; H01M 2/0257–2/0295; H01M 2/10; H01M 2/1016; H01M 2/1061–2/1066
(Continued)

(56) References Cited

U.S. PATENT DOCUMENTS 4,209,091 A * 6/1980 Lieberman .................. 206/704
5,663,008 A 9/1997 Shimakawa et al.
(Continued)

FOREIGN PATENT DOCUMENTS

JP 9-219181 A2 8/1997
JP 11111250 A * 4/1999
(Continued)

OTHER PUBLICATIONS

Linden, D.; Reddy, T.B. (2002). Handbook of Batteries (3rd Edition). McGraw-Hill, chapter 5.5 and 5.6.*
(Continued)

*Primary Examiner* — Jonathan Crepeau
*Assistant Examiner* — Jacob Buchanan
(74) *Attorney, Agent, or Firm* — Lerner, David, Littenberg, Krumholz & Mentlik, LLP

(57) ABSTRACT

Disclosed herein is a battery module using battery cells each having an electrode assembly mounted in a battery case including a resin layer and a metal layer as unit cells, wherein each battery cell has a thin upper end, including a sealing part, which is formed at a region where electrode terminals are placed, and an impact-absorbing member is mounted at the upper end of each battery cell. The battery module according to the present invention prevents the weak upper parts of battery cells, such as electrode terminals and sealing parts, from the breakage of the battery module or the occurrence of a short circuit in the battery module due to the
(Continued)

movement of the battery cells caused by dropping of the battery module or application of external impacts to the battery module.

20 Claims, 7 Drawing Sheets

(51) Int. Cl.
*H01M 2/02* (2006.01)
*H01M 2/20* (2006.01)
*H01M 2/30* (2006.01)
*H01M 10/052* (2010.01)
*H01M 10/0585* (2010.01)

(52) U.S. Cl.
CPC ....... *H01M 2/0287* (2013.01); *H01M 2/1077* (2013.01); *H01M 2/202* (2013.01); *H01M 2/206* (2013.01); *H01M 2/305* (2013.01); *H01M 10/052* (2013.01); *H01M 10/0585* (2013.01); *Y02T 10/7011* (2013.01)

(58) Field of Classification Search
USPC ...................................... 429/61–62, 149–180
See application file for complete search history.

(56) References Cited

U.S. PATENT DOCUMENTS

| 5,929,600 A * | 7/1999 | Hasegawa | H01M 2/105 320/112 |
|---|---|---|---|
| 6,162,559 A * | 12/2000 | Vutetakis et al. | 429/100 |
| 6,472,098 B1 * | 10/2002 | Sawada | B60L 11/1809 429/100 |
| 2004/0021442 A1 * | 2/2004 | Higashino | 320/112 |
| 2005/0140338 A1 * | 6/2005 | Kim et al. | 320/150 |
| 2006/0093905 A1 * | 5/2006 | Kim | 429/175 |
| 2006/0162149 A1 * | 7/2006 | Ha | H01M 2/1061 29/623.1 |
| 2006/0164812 A1 * | 7/2006 | Ha | H01M 2/1061 361/709 |
| 2006/0170394 A1 * | 8/2006 | Ha | H01M 2/1022 320/107 |
| 2006/0170396 A1 * | 8/2006 | Ha | H01M 2/1061 320/116 |
| 2006/0177733 A1 * | 8/2006 | Ha | H01M 2/0212 429/159 |
| 2006/0194101 A1 * | 8/2006 | Ha | H01M 2/1077 429/158 |

FOREIGN PATENT DOCUMENTS

| JP | 2000-195480 | * | 7/2000 | .............. H01M 2/10 |
| JP | 2004103258 A | * | 4/2004 | .............. H01M 2/10 |
| JP | 2009163932 A | * | 7/2009 | .............. H01M 2/10 |

OTHER PUBLICATIONS

Machine Translation of Kikuta et al. JP2000-195480 (Jul. 2000).*
Machine Translation of JP 2004-103258 (Apr. 2004).*
Machine Translation of Okano et al. JP 2009-163932 (Jul. 2009).*

* cited by examiner

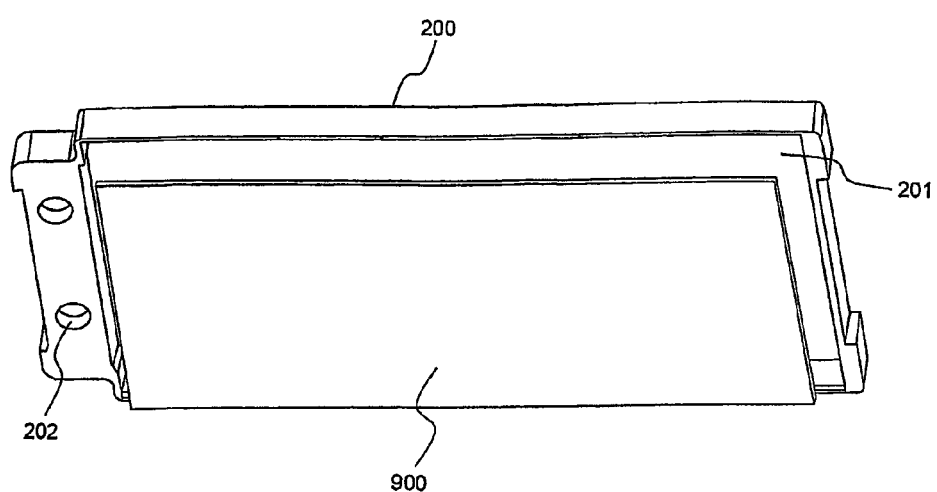

MIDDLE OR LARGE-SIZED BATTERY MODULE EMPLOYING IMPACT-ABSORBING MEMBER

CROSS REFERENCE TO RELATED APPLICATIONS

The present application is a national phase entry under 35 U.S.C. §371 of International Application No. PCT/KR2007/001184, filed Mar. 9, 2007, published in English, which claims the benefit of Korean Patent Application No. KR10-2006-0022923, filed Mar. 13, 2006. The disclosures of said applications are incorporated by reference herein.

FIELD OF THE INVENTION

The present invention relates to a middle- or large-sized battery module including an impact-absorbing member, and, more particularly, to a battery module using battery cells each having an electrode assembly mounted in a battery case including a resin layer and a metal layer as unit cells, wherein each battery cell has a thin upper end, including a sealing part, which is formed at a region where electrode terminals are placed, and an impact-absorbing member is mounted at the upper end of each battery cell, thereby preventing the breakage of the battery case or the occurrence of a short circuit when an external force is applied to the electrode terminals and sealing parts of the respective unit cells.

BACKGROUND OF THE INVENTION

Recently, a secondary battery, which can be charged and discharged, has been widely used as an energy source for wireless mobile devices. Also, the secondary battery has attracted considerable attention as an energy source for electric vehicles and hybrid electric vehicles, which have been developed to solve problems, such as air pollution, caused by existing gasoline and diesel vehicles using fossil fuel. As a result, kinds of applications using the secondary battery are being increased owing to advantages of the secondary battery, and hereafter the secondary battery is expected to be applied to more applications and products than now.

As kinds of applications and products, to which the secondary battery is applicable, are increased, kinds of batteries are also increased such that the batteries can provide outputs and capacities corresponding to the various applications and products. Furthermore, there is a strong need to reduce the sizes and weights of the batteries applied to the corresponding applications and products.

Small-sized mobile devices, such as mobile phones, personal digital assistants (PDAs), digital cameras, and laptop computers, use one or several small-sized, light battery cells for each device according to the reduction in size and weight of the corresponding products. On the other hand, middle- or large-sized devices, such as electric bicycles, electric motorcycles, electric vehicles, and hybrid electric vehicles, use a middle- or large-sized battery module (or a middle- or large-sized battery pack) having a plurality of battery cells electrically connected with each other because high output and large capacity is necessary for the middle- or large-sized devices. The size and weight of the battery module is directly related to the receiving space and output of the corresponding middle- or large-sized device. For this reason, manufacturers are trying to manufacture small-sized, light battery modules. Furthermore, devices, which are subject to a large number of external impacts and vibrations, such as electric bicycles and electric vehicles, require stable electrical connection and physical coupling between components constituting the battery module. In addition, a plurality of battery cells are used to accomplish high output and large capacity, and therefore, the safety of the battery module is regarded as important.

Based on their shapes, secondary batteries used as unit cells for such a battery module or battery pack are generally classified into a cylindrical battery, a prismatic battery, and a pouch-shaped battery. Among them, the pouch-shaped battery has attracted considerable attention since the pouch-shaped battery can be stacked with high integration, has high energy density per unit weight, is inexpensive, and can be easily modified.

The pouch-shaped battery is a battery constructed in a structure in which an electrode assembly having a cathode/separator/anode structure is mounted in a pouch-shaped battery case made of, for example, an aluminum laminate sheet while the electrode assembly is impregnated with an electrolyte in a sealed state. A representative example of the pouch-shaped battery may be a lithium-ion polymer battery (LiPB). The LiPB is a battery constructed in a structure in which cathodes, anodes, separators are joined with each other, while the separators are disposed respectively between cathodes and anodes, and the joined cathodes, anodes, and separators are impregnated with a lithium electrolyte, thereby maximally preventing the leakage of the electrolyte. Generally, the electrode assembly is manufactured by coating adhesive layers to opposite sides of the respective separators, and thermally welding the cathodes and anodes, to which active materials are applied, to the corresponding separators.

FIG. 1 typically illustrates a general structure of a representative LiPB including a stacking type electrode assembly.

Referring to FIG. 1, the LiPB 100 is constructed in a structure in which an electrode assembly 120 including cathodes, anodes, and separators disposed respectively between the cathodes and the anodes is mounted in a pouch-shaped battery case 110 in a sealed state such that two electrode leads 130 and 140 electrically connected to cathode and anode taps 122 and 124 of the electrode assembly 120 are exposed to the outside of the battery case 110.

The battery case 110 is made of a soft wrapping material, such as an aluminum laminate sheet. The battery case 110 includes a case body 112 having a hollow receiving part 111 for receiving the electrode assembly 120 and a cover 113 integrally connected to the case body 112.

The electrode assembly 120 of the LiPB 100 may be constructed in a jelly-roll type structure in addition to the stacking type structure shown in FIG. 1. The stacking type electrode assembly 120 is constructed in a structure in which the cathode taps 122 and the anode taps 124 are welded to the electrode leads 130 and 140, respectively, and insulation films 150 are attached to the upper and lower surfaces of the electrode leads 130 and 140 for securing electrical insulation and sealability between the electrode leads 130 and 140 and the battery case 110.

The LiPB 100 manufactured as described above is shown in FIG. 2. For convenience of description, the LiPB will be referred to as a battery cell.

Referring to FIG. 2, when the battery case 110 is thermally welded while the electrode assembly (not shown) is mounted in the battery case 110, sealing parts 114 and 115 are formed at the upper end and opposite sides of the battery case 110. Among them, the side sealing parts 115 are vertically bent upward such that the side sealing parts 115 are brought into tight contact with the battery cell body 116, whereby the total size of the battery case 110 is decreased. On the other hand, the upper-end sealing part 114 is not bent because the electrode leads 130 and 140 protrude from the battery case 110 through upper-end sealing part 114.

A middle- or large-sized battery module using the battery cell may be constructed in various manners. For example, one to four battery cells may be mounted in an additional member, such as a cartridge, and a plurality of cartridges may be stacked such that the cartridges are electrically connected with each other. Alternatively, a plurality of battery cells are stacked, without using additional cartridges, such that the battery cells are electrically connected with each other. The former example has an advantage in that the battery module has a structural stability but has a disadvantage in that the manufacturing costs of the battery module are high, and the size of the battery module is big. The latter example has an advantage and disadvantage directly opposite to the former example.

However, the battery cell shown in FIG. 2 has a low mechanical strength although the battery module is constructed in any structure. As a result, the battery module has a disadvantage in that the battery module including the battery cell is weak to external impacts. Especially, the upper end of the battery cell, including the electrode leads (the electrode terminals) and the sealing parts, which is indicated by a dotted-line region A of FIG. 2, is weak to dropping or external impacts. For example, the electrode terminals are connected to additional connecting members for electrical connection. When the battery cell moved toward the electrode terminals due to the dropping of the battery module or application of external impacts to the battery module, the battery cell body may be brought into contact with the connecting members or coupling members with the result that the battery case may easily break. Also, a short circuit may easily occur due to the contact between the battery cell body and the electrode terminals or the connecting members.

Consequently, there is high necessity for a measure to effectively solve the above-mentioned problems.

SUMMARY OF THE INVENTION

Therefore, the present invention has been made to solve the above problems, and other technical problems that have yet to be resolved.

Specifically, it is a first object of the present invention to provide a battery module that is capable of preventing the weak upper parts of battery cells, such as electrode terminals and sealing parts, from the breakage of the battery module or the occurrence of a short circuit in the battery module due to the movement of the battery cells caused by dropping of the battery module or application of external impacts to the battery module.

It is a second object of the present invention to provide a battery module constructed in a structure in which the battery module can be flexibly extended and contracted depending upon desired electrical capacity and output, wires used to electrically connect components constituting the battery module are compact, and the electrical connection between the components of the battery module is stably accomplished.

In accordance with one aspect of the present invention, the above and other objects can be accomplished by the provision of a battery module using battery cells each having an electrode assembly mounted in a battery case including a resin layer and a metal layer as unit cells, wherein each battery cell has a thin upper end, including a sealing part, which is formed at a region where electrode terminals are placed, and an impact-absorbing member is mounted at the upper end of each battery cell.

The inventors of the present application found that the upper end of each battery cell was damaged when the battery module is dropped or external impacts are applied to the battery module. Specifically, the inventors found that, as the cell body moved toward the electrode terminals of each battery cell, the connecting member or the coupling member mounted to the electrode terminals was brought into contact with the weak battery case with the result that the battery case broke or a short circuit occurred. When the impact-absorbing member is mounted at the thin upper end of each battery cell for absorbing impacts applied to the battery cell in accordance with the present invention, it is possible to elastically restrain the movement of the cell body and to prevent the contact between the electrode terminals and the cell body, thereby preventing the breakage of the battery case or the occurrence of the short circuit. Consequently, the impact-absorbing member serves to absorb external impacts while reinforcing the upper end of the battery cell, which is mechanically weak due to the small thickness thereof, thereby improving the structural safety of the battery module.

In accordance with the present invention, the battery case may be made of a laminate sheet including a resin layer and a metal layer. Preferably, the battery case is a pouch-shaped case made of an aluminum laminate sheet. When the battery case is thermally welded while the electrode assembly is mounted in the battery case, side sealing parts and an upper-end sealing part are formed as previously described in connection with FIG. 2.

The impact-absorbing member may have a length approximately corresponding to the upper end of each battery cell and a thickness approximately corresponding to each battery cell while the impact-absorbing member is mounted at the upper end of each battery cell. On the other hand, when the battery module is constructed in a structure in which a plurality of battery cells are sequentially stacked one on another, and the impact-absorbing member is made of an elastic material, the impact-absorbing member mounted at the upper end of one battery cell (a) may be partially pressurized by another battery cell (b) stacked on the battery cell (a). Consequently, the impact-absorbing member may have a thickness slightly greater than that of the battery cell (a) while the impact-absorbing member is mounted at the upper end of the battery cell (a).

The impact-absorbing member is not particularly restricted so long as the impact-absorbing member is made of a material that absorbs impacts, elastically retrains the movement of each battery cell, and is electrically insulative. For example, the impact-absorbing member may be made of natural rubber, synthetic rubber, or synthetic resin. Preferably, the impact-absorbing member is constructed in an elastic porous structure to provide high elasticity.

Preferably, an adhesive layer is applied to the bottom of the impact-absorbing member such that the impact-absorbing member can be fixed to the upper end of each battery cell. According to circumstances, another adhesive layer may be applied to the top of the impact-absorbing member such that the impact-absorbing member can be also fixed to a corresponding region of another stacked battery cell.

The battery module according to the present invention may be constructed in a structure in which unit cells are stacked while the unit cells are mounted in additional members, such as cartridges, or in a structure in which unit cells are stacked without using such cartridges. In the case of a battery module in which cartridges are not used, whereby the total size of the battery module is reduced, for example, a battery module in which electrode terminals are used for electrical connection as well as the mechanical coupling required to construct the battery module, the mechanical strength of the upper end of each battery cell is especially weak. Consequently, when the impact-absorbing member is mounted at the upper end of each battery cell in accordance with the present invention, the safety of the battery module is further improved.

In a preferred embodiment, the unit cells are stacked such that the electrode terminals having the same polarities are oriented in the same directions, the electrode terminals are provided with coupling through-holes, through which coupling members coupled to a module case are inserted.

Both the electrode terminals, i.e., the anode terminal and the cathode terminal, may be formed at one side of each battery cell. Alternatively, the electrode terminals may be formed at two sides of each battery cell. For example, the anode terminal and the cathode terminal may be formed at the upper and lower ends of each battery cell while the anode terminal and the cathode terminal are opposite to each other.

In a preferred embodiment, the battery module includes insulating members disposed between the electrode terminals of neighboring unit cells for electrically insulating the electrode terminals of the neighboring unit cells, the insulating members having protrusions that can be coupled in the through-holes, and connecting members coupled to the insulating members for electrically connecting, in series or in parallel, the electrode terminals of the unit cells coupled to the insulating member.

In this case, the insulating members also serve to mechanically interconnect the electrode terminals via the protrusions. Preferably, the protrusions are provided with through-holes having an inner diameter less than that of the through-holes of the electrode terminals, whereby the coupling members are inserted through the through-holes of the protrusions, after the unit cells are stacked while the insulating members are disposed between the neighboring unit cells, such that the unit cells are connected with each other.

The details of the insulating members and the connecting members are described in Korean Patent Application-No. 2004-112590, which has been filed in the name of the applicant of the present application. The disclosure of the application is incorporated herein by reference.

The battery module constructed without using additional cartridges may have a compact structure, and therefore, the battery module may be preferably used in a device having a limited installation space.

In a preferred embodiment, the battery module includes a plate on which the unit cells are stacked and a circuit unit for controlling the operation of the unit cells.

The plate is not particularly restricted so long as the plate is constructed in a structure in which the unit cells are stacked on the plate. For example, the plate may be constructed in a case structure having a receiving part corresponding to the size of each unit cell such that the unit cells can easily mounted on the plate. Preferably, the case is a separation-type structure for covering the top and bottom of the stacked unit cells.

In a preferred embodiment, the secondary battery module includes a plurality of secondary batteries, which can be charged and discharged, used as unit cells, a lower case having an upper-end receiving part, in which the unit cells are sequentially stacked one on another, an upper case having a lower-end receiving part for covering the top of the unit cells stacked on the lower case, a first circuit unit for electrically connecting the stacked unit cells, the first circuit unit having a sensing board assembly for sensing the voltage, current, and/or temperature of the unit cells, a second circuit unit electrically connected to the first circuit unit, the second circuit unit having a main board assembly for controlling the overall operation of the battery module, and a third circuit unit electrically connected to the second circuit unit, the third circuit unit being connected to an external output terminal while preventing overcharge, overdischarge, and/or overcurrent of the unit cells.

The width and length of the battery module are slightly greater than those of the stacked unit cells, and therefore, the overall size of the battery module is very small. Consequently, it is possible to minimize the size of the battery module, whereby it is possible to effectively mount the battery module at an external apparatus or system to which the battery module is applied. Also, the upper case and the lower case are separated from each other. Consequently, when it is needed to change the capacity and output of the battery module, it is possible to increase or decrease the number of unit cells stacked between the upper case and the lower case, and therefore, it is possible to flexibly design the battery module.

The overall size of the upper case and the lower case approximately corresponds to the size of each unit cell. Consequently, the upper-end receiving part of the lower case, in which the unit cell is received, and the lower-end receiving part of the upper case, in which the unit cell is received, correspond to the size of the cell body of the unit cell.

Preferably, the battery module further includes a plate-shaped, high-strength safety member disposed between the outermost one of the stacked unit cells and the upper case such that the safety member is arranged in parallel with electrode plates of the outermost unit cell.

Generally, a compact, light-weight battery module has a low mechanical safety. For example, the battery module may drop or collide with a solid body or structure due to external impacts. Also, internal short circuits may occur in the unit cells of the battery module when a needle-shaped conductor penetrates into the unit cells. Especially, when the external impacts are applied to the battery module in the direction in which the electrode plates of the unit cells are arranged, the safety of the battery module may be seriously deteriorated. Consequently, when the plate-shaped, high-strength safety member is mounted inside the upper case such that the safety member is arranged in parallel with the electrode plates of the unit cell, the battery module has a high mechanical safety although the weight of the battery module is slightly increased.

Preferably, the safety member is made of a high-strength metal material. More preferably, the safety member is made of stainless steel. Preferably, the safety member has a surface area corresponding to the unit cell and an appropriate thickness. When the thickness of the safety member is too small, it is not possible to provide a desired mechanical strength. When the thickness of the safety member is too large, on the other hand, the weight of the battery module is considerably increased.

In a preferred embodiment, double-sided adhesive members are disposed between the stacked unit cells. The double-sided adhesive members allow the unit cells to be more stably stacked and fixed in the battery module. The double-sided adhesive members may be double-sided adhesive tapes; however, the double-sided adhesive members are not limited to the double-sided adhesive tapes. Preferably, two or more double-sided adhesive members are provided at one stacked unit cell such that the double-sided adhesive members are spaced apart from each other. In this case, a predetermined gap is provided between the stacked unit cells by the double-sided adhesive tapes. By the gap between the stacked unit cells, the change in volume of the unit cells is allowed during the charge and discharge of the unit cells, and heat is effectively dissipated from the unit cells during the charge and discharge of the unit cells.

The first circuit unit includes connecting members for connecting the unit cells in parallel or in series with each other and a sensing board assembly for sensing the voltage, current, and/or temperature of the respective unit cells. Preferably, the first circuit unit receives voltage and temperature signals from the unit cells. The temperature may be measured by the sending board assembly or the main board assembly as overall temperature of the unit cells. Preferably, the first circuit unit is attached to the side of the battery module adjacent to the electrode terminals of the unit cells.

The structure of the connecting members is not particularly restricted so long as the unit cells can be connected in parallel or in series with each other by the connecting members. Preferably, a safety element is connected between the connecting members for interrupting electric current when overvoltage or overheat is generated. The safety element may include a fuse, a bimetal, and a positive temperature coefficient (PTC) element.

Preferably, the sensing board assembly is made of a printed circuit board (PCB), and the sensing board assembly is electrically connected to the respective unit cells.

The second circuit unit may be attached to the side of the battery module adjacent to the electrode terminals of the unit cells together with the first circuit unit, may be mounted in the lower-end receiving part of the lower case, or may be attached to the opposite side of the battery module such that the second circuit unit is opposite to the first circuit unit. Preferably, the second circuit unit is mounted in the lower-end receiving part of the lower case. In this case, the unit cells are electrically connected to the second circuit unit mounted in the lower-end receiving part of the lower case via the first circuit unit, and the operation of the battery module is controlled by the main board assembly of the second circuit unit.

The third circuit unit, which is the final element of the battery module connected to an external device for controlling the overcharge, overdischarge, and overcurrent of the unit cells during the charge and discharge of the unit cells, may be attached to the side of the battery module adjacent to the electrode terminals of the unit cells together with the first circuit unit, may be mounted in the lower-end receiving part of the lower case, or may be attached to the opposite side of the battery module such that the second circuit unit is opposite to the first circuit unit. Preferably, the third circuit unit is attached to the opposite side of the battery module such that the third circuit unit is opposite to the first circuit unit.

The circuit units may be partially or entirely incorporated. Preferably, the second circuit unit is mounted in the lower-end receiving part of the lower case, and the third circuit unit is attached to the opposite side of the battery module such that the third circuit unit is opposite to the first circuit unit. In this case, the battery module according to the present invention is constructed in a structure in which the circuit units related to the operation of the unit cells surround the battery module, whereby the overall size of the battery module is greatly reduced.

In a preferred embodiment, the third circuit unit comprises a switching board including switching elements for controlling the charge and discharge of the secondary battery module and a heat sink structure connected to the switching elements. Preferably, the switching board is a printed circuit board (PCB) including related circuits.

The switching elements are connected in series with the unit cells constituting the battery module for controlling electric current flowing in the unit cells. The switching elements are also connected to a protection circuit for sensing the voltage and/or current of the unit cells to control the switching elements. The switching elements are not particularly restricted so long as the switching elements can control the overcharge, overdischarge, or overcurrent of the unit cells. For example, field effect transistor (FET) elements or transistors may be used as the switching elements. Preferably, the FET elements are used as the switching elements.

The charge-purpose switching element is a switching element for controlling the charge state of the unit cells, and the discharge-purpose switching element is a switching element for controlling the discharge state of the unit cells. Generally, the switching elements of the battery module include the charge-purpose switching element and the discharge-purpose switching element.

The switching elements are connected to a control circuit for sensing the voltage and/or current of the unit cells to control the switching elements. The switching elements are controlled ON or OFF according to a signal output from the control circuit. Specifically, the control circuit maintains the switching elements (the charge-purpose switching element and the discharge-purpose switching element) in the ON state. When an abnormal state occurs during the charge of the unit cells, on the other hand, the charge-purpose switching element is turned off to interrupt the charge current. When an abnormal state occurs during discharge of the unit cells, the discharge-purpose switching element is turned off to interrupt the discharge current. Also, when the voltage of the unit cells exceeds a predetermined maximum voltage level during the charge of the unit cells, the control circuit outputs a signal for turning the charge-purpose switching element off to prevent the overcharge of the unit cells. When the voltage of the battery is lowered below a predetermined minimum voltage level during the discharge of the battery, on the other hand, the control circuit outputs a signal for turning the discharge-purpose switching element off to prevent the overdischarge of the unit cells. When the output sides of the unit cells short-circuit, and therefore, overcurrent flows in the unit cells, or when a high charge voltage is applied to the unit cells due to abnormal operation of the unit cells, and therefore, overcurrent flows in the unit cells, the control circuit senses the overcurrent flowing in the unit cells and outputs signals for turning the switching elements off. The control circuit, which controls the switching elements, may be included in the printed circuit board or an additional circuit member.

The battery module according to the present invention is preferably used in a middle- or large-sized battery system having high output and large capacity. The range of the high output and the large capacity is not particularly restricted.

For example, the battery module according to the present invention may be used as a power source for various applications and products, including a power source for vehicles, such as electric bicycles (e-bikes), electric motorcycles, electric vehicles, or hybrid electric vehicles. Especially, the battery module according to the present invention is preferably used as a power source for the electric bicycles, since the battery module is constructed in a compact structure.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a perspective view illustrating the bottom of an upper case of the battery module shown in FIG. 5 to which a safety member is mounted.

DETAILED DESCRIPTION OF PREFERRED EMBODIMENTS

Now, preferred embodiments of the present invention will be described in detail with reference to the accompanying drawings. It should be noted, however, that the scope of the present invention is not limited by the illustrated embodiments.

Figure 3:
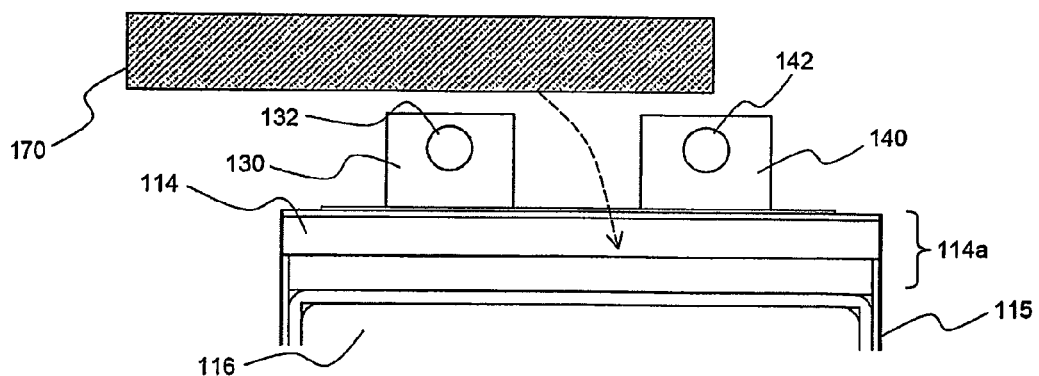
FIGS. 3 and 4 are typical views illustrating a process for attaching an impact-absorbing member to the upper end of a battery cell, including a sealing part, in accordance with a preferred embodiment of the present invention.
Figure 4:
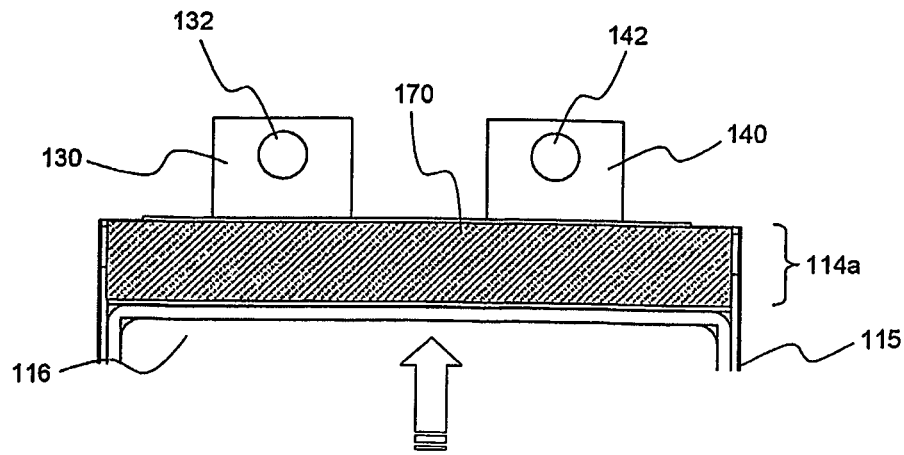

FIGS. 3 and 4 are typical views illustrating a process for attaching an impact-absorbing member to the upper end of a battery cell, including a sealing part, in accordance with a preferred embodiment of the present invention.

Figure 1:
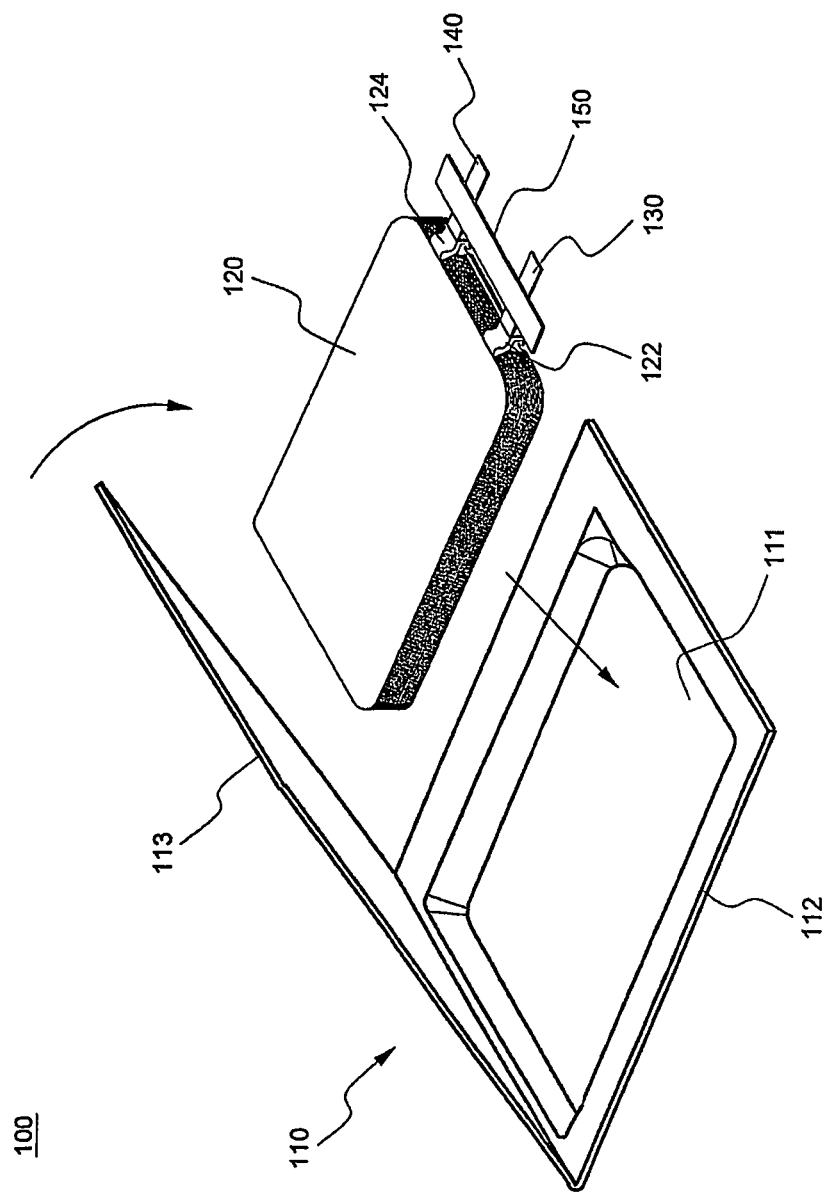
FIGS. 1 and 2 are typical views illustrating a general structure of a conventional lithium-ion polymer battery (LiPB) including a stacking type electrode assembly.
Figure 2:
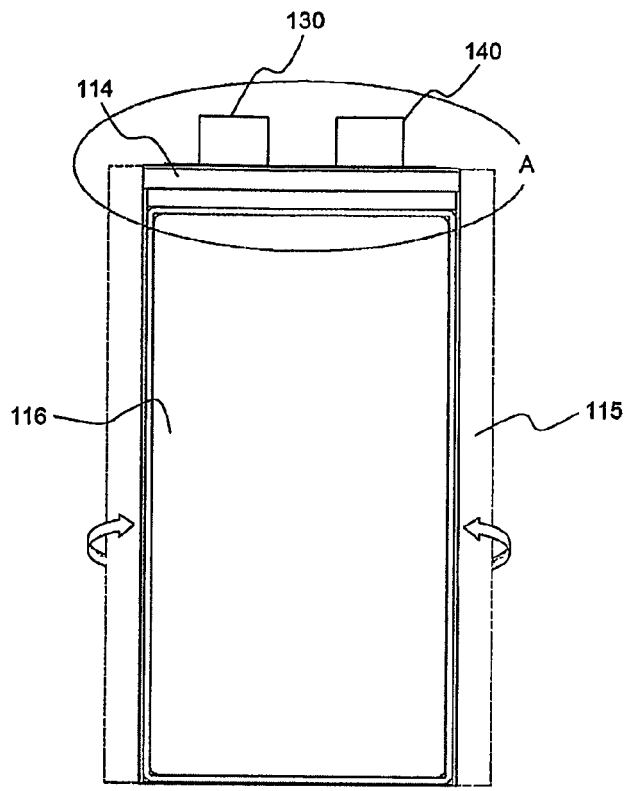

Referring to these drawings, side sealing parts 115 are bent upward such that the side sealing parts are brought into tight contact with a cell body 116, as previously described in connection with FIG. 2. A cathode terminal 130 and an anode terminal 140 protrude from an upper-end sealing part 114 while the cathode terminal 130 and the anode terminal 140 are wrapped with insulation films (not shown). An upper end 114a of the battery cell, including the thermally welded upper-end sealing part 114, has a thickness less than that of the cell body 116. Specifically, the upper end 114a of the battery cell includes an upper-side region of the upper-end sealing part 114 to which thermal welding is actually performed during the manufacture of the battery cell and a lower-side region of the upper-end sealing part 114 which is bent corresponding to the outer circumference of an electrode assembly (not shown) during the manufacture of the battery cell. The upper end 114a of the battery cell has a small thickness.

An impact-absorbing member 170 is mounted to the upper end 114a of the battery cell. An adhesive layer is applied to the lower surface (the bottom surface) of the impact-absorbing member 170 such that the impact-absorbing member 170 can be fixedly attached to the upper end 114a of the battery cell. Consequently, when the cell body 116 moves toward the electrode terminals 130 and 140 due to dropping of the battery cell or application of external impacts to the battery cell, the movement of the cell body 116 is elastically prevented by the impact-absorbing member 170.

Figure 5:
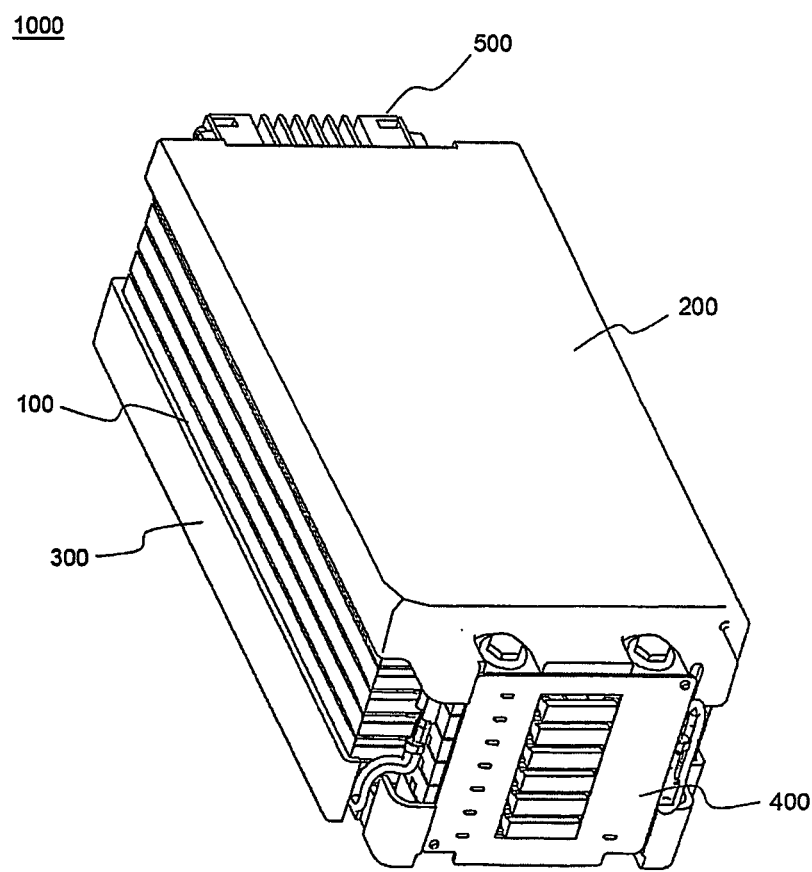
FIGS. 5 and 6 are a perspective view and side view illustrating a battery module according to a preferred embodiment of the present invention.
Figure 6:
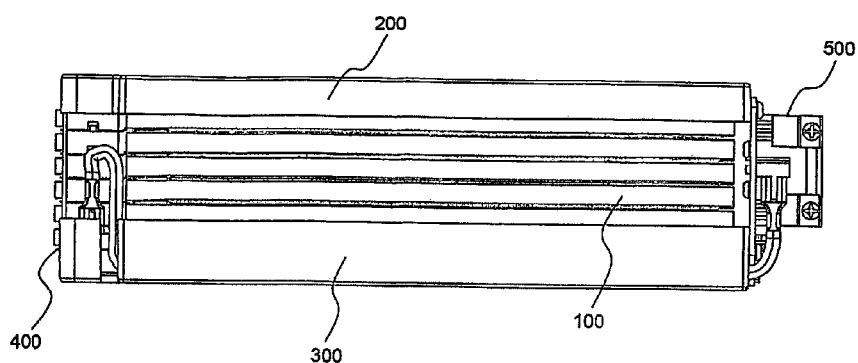

FIGS. 5 and 6 are a perspective view and side view illustrating a battery module according to a preferred embodiment of the present invention.

Referring to these drawings, the battery module 1000 includes an upper case 200, a lower case 300, a plurality of unit cells 100, a first circuit unit 400, a second circuit unit (not shown), and a third circuit unit 500. The unit cells 100 are stacked one on another between the upper case 200 and the lower case 300, which are separated from each other. The first circuit unit 400 is located at the front of the battery module 1000, the second circuit unit is located at the bottom of the battery module 1000, and the third circuit unit 500 is located at the rear of the battery module 1000.

Since the upper case 200 and the lower case 300 are separated from each other, the number of unit cells 100 that can be stacked is not particularly restricted. Consequently, it is possible to easily design a battery module 1000 having desired electric capacity and output by modifying only the first circuit unit 400 and the third circuit unit 500 depending upon the number of the unit cells 100 stacked. Also, the unit cells 110 are exposed to the outside, and therefore, the dissipation of heat from the unit cells 100 is effectively accomplished during the charge and discharge of the unit cells 100.

Figure 7:
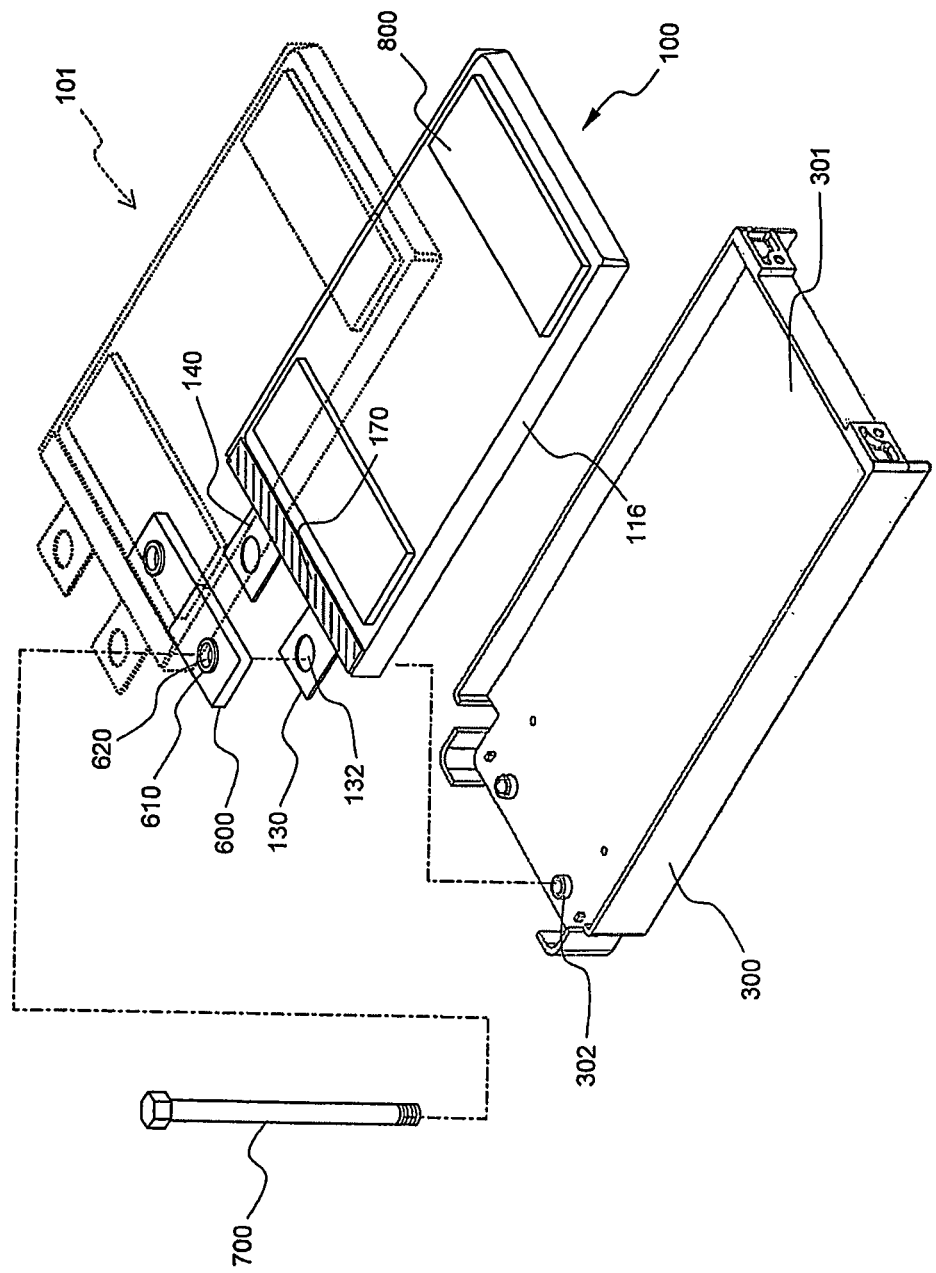
FIG. 7 is a perspective view illustrating the top of a lower case of the battery module shown in FIG. 5.
Figure 8:
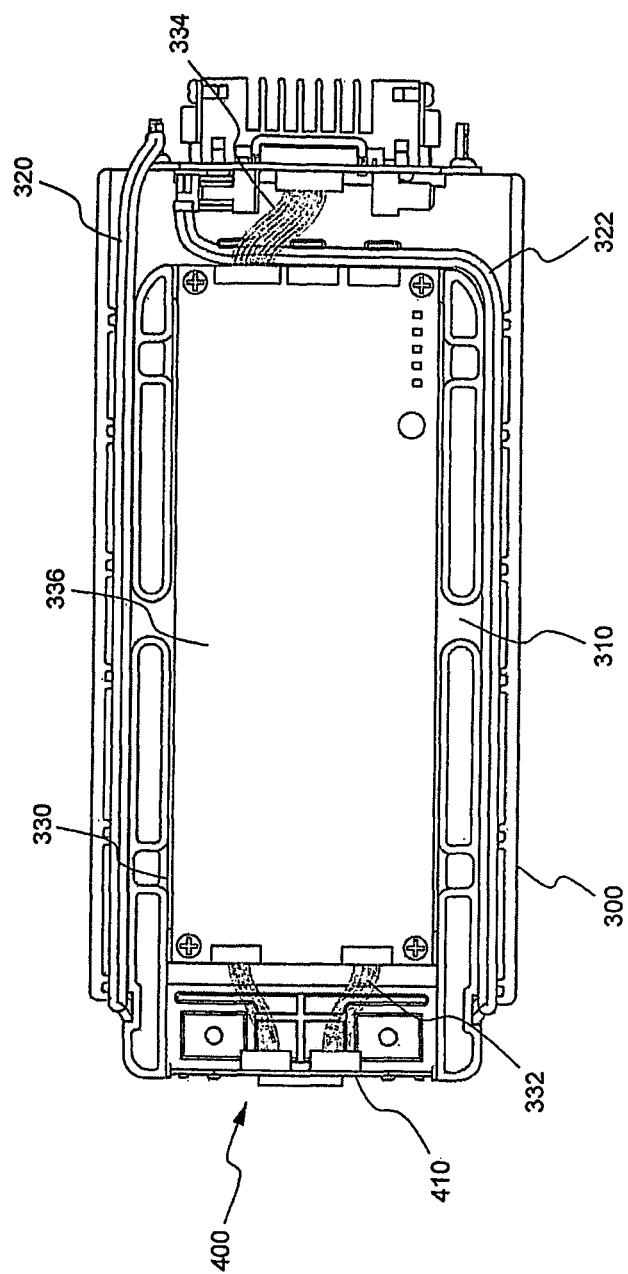
FIG. 8 is a perspective view illustrating the bottom of the lower case to which a second circuit unit is mounted.

FIG. 7 is a perspective view illustrating the top of the lower case of the battery module shown in FIG. 5 to which unit cells are mounted, and FIG. 8 is a perspective view illustrating the bottom of the lower case to which the second circuit unit is mounted.

Referring first to FIG. 7, the lower case 300 is a structural body formed in a shape approximately corresponding to the external shape of a unit cell 100. The lower case 300 includes an upper-end receiving part 301 for receiving the unit cell 100. The lower case 300 is made of a material having high strength and high electrical insulation, preferably a plastic material, such as acrylonitrile-butadiene-styrene (ABS), polycarbonate (PC), or polybutylene terephthalate (PBT).

The unit cell 100, which is stacked on the lower case 300, is constructed in a structure in which a cathode terminal 130 and an anode terminal 140 protrude from the upper end of the cell body 116, and an impact-absorbing member 170 is attached to the upper end of the unit cell 100, including a sealing part. In the electrode terminals 130 and 140 are formed coupling through-holes 132, through which additional coupling members, for example, fasteners 700, are inserted while a plurality of unit cells 100 and 101 are stacked one on another. The fasteners 700 are also inserted through fixing holes 302 formed in the lower case 300, and then nuts (not shown) are threadedly fitted on with the fasteners 700 at the bottom of the lower case 300, whereby the unit cells 100 and 101 are fixed to the lower case 300.

Between the unit cells 100 and 101 is mounted an insulating member 600 which is located on the electrode terminals 130 and 140 for accomplishing the electrical insulation. At the insulating member 600 are formed protrusions 610 which are coupled in the through-holes 132 of the electrode terminals 130 and 140. The protrusions 610 also have through-holes 620, through which the fasteners 700 are inserted, thereby maintaining the electrical insulation between the fasteners 700 and the electrode terminals 130 and 140. Although not shown in the drawing, the electrical connection between the electrode terminals is accomplished by an additional connecting member (not shown) when including the insulating member 600. The details of the insulating member and the connecting member are described in Korean Patent Application No. 2004-112590, which has been filed in the name of the applicant of the present application. The disclosure of the application is incorporated herein by reference.

When the battery module shown in FIG. 5 drops with the with the electrode terminals 130 and 140 of the unit cells down, for example, the impact-absorbing member 170 restrains the movement of the cell body 160 and, furthermore, prevents the breakage of the cell body 160 or the occurrence of a short circuit due to the contact between the cell body 160 and the insulating member 600 and/or the fasteners 700.

To the cell body 116 of each unit cell 100 are attached two double-sided adhesive tapes 800, by which the stable coupling between the stacked unit cells 100 and 101 is further secured. Furthermore, the stacked unit cells 100 and 101 are spaced apart from each other by the thickness of the double-sided adhesive tapes 800. By the gap between the stacked unit cells 100 and 101, the change in volume of the unit cells 100 and 101 is allowed during the charge and discharge of the unit cells 100 and 101, and heat is effectively dissipated from the unit cells 100 and 101 during the charge and discharge of the unit cells 100 and 101.

As shown in FIG. 8, the lower case 300 is provided at the bottom thereof with a second circuit unit 330, which is mounted in a lower-end receiving part 310. At the bottom of the lower case 300 are arranged electric wires 320 and 322 for conducting electric current between the cathode and the anode such that the electric wires 320 and 322 are connected to the first circuit unit 400 and the third circuit unit. Also, electric wires 332 and 334 are arranged at the bottom of the lower case 300 such that the electric wires 332 and 334 are electrically connected to a sensing board assembly 410 of the first circuit unit 400 and the third circuit unit. The second circuit unit 330 is covered by a cover 336 for protecting the second circuit unit 330 from the outside.

FIG. 9 is a perspective view illustrating the bottom of the upper case of the battery module shown in FIG. 5 to which a safety member is mounted.

Referring to FIG. 9, the upper case 200 is made of an insulating material identical to or different from that of the lower case 300. Preferably, the upper case 200 is made of a plastic resin.

The upper case 200 has a lower-end receiving part 201 corresponding to the size of the unit cell 100 (see FIG. 5) such that the unit cell 100 is received in the lower-end receiving part 201. In the upper case are formed holes which are located at positions corresponding to the through-holes of the electrode terminals of the unit cell 100.

To the lower-end receiving part 201 of the upper case 200 is mounted a plate-shaped safety member 900. The safety member 900 has a size approximately equal to that of the unit cell. The safety member 900 is arranged in parallel with electrode plates of the unit cell.

Hereinafter, examples of the present invention will be described in more detail. It should be noted, however, that the scope of the present invention is not limited by the illustrated examples.

EXAMPLE 1

An electrode assembly was mounted in a battery case made of an aluminum laminate sheet, and the battery case was sealed by thermal heating to manufacture a battery cell having a width of approximately 94 mm, a length of approximately 185 mm (approximately 200 mm when including electrode taps), and a thickness of approximately 4.5 mm. The width of a thin upper end of the battery cell, including a sealing region, was approximately 12 mm. An impact-absorbing member having a size corresponding to the upper end of the battery cell and a thickness of approximately 4 mm and made of a porous rubber material was attached to the battery cell, as shown in FIGS. 3 and 4. A total of seven battery cells were manufactured such that the battery cells had the above-described construction, and the manufactured battery cells were stacked between an upper case and a lower case, as shown in FIGS. 5 and 6, to manufacture a battery module.

COMPARATIVE EXAMPLE 1

A battery module was manufactured in the same manner as Example 1 except that an impact-absorbing member was not attached to the upper end of each battery cell.

EXPERIMENTAL EXAMPLE 1

The battery module manufactured according to Example 1 and the battery module manufactured according to Comparative example 1 were dropped with the upper ends of the respective battery cells down. The free dropping experiments were performed such that the battery modules were dropped from a height of 1 mm above the ground to a concrete floor so as to confirm the breakage or catching fire of the battery modules.

The results of the dropping experiments revealed that the upper ends of the battery cells broke and the electrode assemblies of the respective battery cells went out of the battery module after the 47-time dropping of the battery module manufactured according to Example 1. On the other hand, the upper ends of the battery cells broke and the electrode assemblies of the respective battery cells went out of the battery module after the 30-time dropping of the battery module manufactured according to Comparative example 1.

Consequently, it was confirmed that the battery module manufactured according to Example 1 had high safety against the free dropping of the battery cells with the upper ends of the respective battery cells down.

EXPERIMENTAL EXAMPLE 2

Experiments ware performed to confirm the safety of the battery modules in conditions severer than Experimental Example 1.

Specifically, the battery module manufactured according to Example 1 and the battery module manufactured according to Comparative example 1 were dropped five times for each side with each side of the respective battery cells down, and then the battery module manufactured according to Example 1 and the battery module manufactured according to Comparative example 1 were repeatedly dropped with the upper ends of the respective battery cells down. The free dropping experiments were performed such that the battery modules were dropped from a height of 1 mm above the ground to a concrete floor so as to confirm the breakage or catching fire of the battery modules.

The results of the dropping experiments revealed that the battery module did not break and catch fire while the battery module manufactured according to Example 1 was dropped five times for each side with each side of the respective battery cells down and dropped 20 times with the upper ends of the respective battery cells down. On the other hand, the battery module caught fire due to internal short circuits of the battery module after the battery module manufactured according to Example 1 was dropped five times for each side with each side of the respective battery cells down and dropped four times with the upper ends of the respective battery cells down.

Consequently, it was confirmed that the battery module manufactured according to Example 1 had high safety even in very severe conditions.

INDUSTRIAL APPLICABILITY

As apparent from the above description, the battery module according to the present invention has the effect of preventing the weak upper parts of battery cells, such as electrode terminals and sealing parts, from the breakage of the battery module or the occurrence of a short circuit in the battery module due to the movement of the battery cells caused by dropping of the battery module or application of external impacts to the battery module.

Furthermore, the battery module according to the present invention is constructed in a structure in which the battery module can be flexibly extended and contracted depending upon desired electrical capacity and output, wires used to electrically connect components constituting the battery module are compact, and the electrical connection between the components of the battery module is stably accomplished.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A battery module using battery cells each having an electrode assembly, the battery cells being mounted as unit cells in a battery case including a resin layer and a metal layer,
    wherein each battery cell has a cell body and an upper end including an upper-end sealing part, the cell body including opposing top and bottom surfaces, the upper end having an upper end thickness extending in a direction between the top and bottom surfaces that is less than a cell body thickness of the cell body extending in a direction between the top and bottom surfaces, the upper-end sealing part being formed at a region where electrode terminals are placed, an impact-absorbing member being mounted at the upper-end sealing part of each battery cell having the upper end thickness, and a double-sided adhesive member disposed on at least one of the top or bottom surfaces,
    wherein the impact-absorbing member is made of natural rubber or synthetic rubber,
    wherein the battery module further includes a plate on which the unit cells are stacked and a circuit unit for controlling the operation of the unit cells,
    wherein the plate is constructed in a case structure having a receiving part corresponding to the size of each unit cell such that the unit cells can be easily mounted on the plate, and the case structure is a separation-type structure for covering the top and bottom of the stacked unit cells,
    wherein the battery module further includes:
    a plurality of secondary batteries, which can be charged and discharged, used as unit cells,
    a lower case having an upper-end receiving part, in which the unit cells are sequentially stacked one on another,
    an upper case having a lower-end receiving part for covering the top of the unit cells stacked on the lower case,
    a first circuit unit for electrically connecting the stacked unit cells, the first circuit unit having a sensing board assembly for sensing the voltage, current, and/or temperature of the unit cells,
    a second circuit unit electrically connected to the first circuit unit, the second circuit unit having a main board assembly for controlling the overall operation of the battery module, and
    a third circuit unit electrically connected to the second circuit unit, the third circuit unit being connected to an external output terminal while preventing overcharge, overdischarge, and/or overcurrent of the unit cells, and
    wherein the first circuit unit is located at a front of the battery module and directly mounted to the upper and lower cases, the second circuit unit is located at a bottom of the battery module and directly mounted to the lower case, and the third circuit unit is located at a rear of the battery module and directly mounted to the upper and lower cases.

2. The battery module according to claim 1, wherein the battery case is a pouch-shaped case made of an aluminum laminate sheet.

3. The battery module according to claim 1, wherein the impact-absorbing member has a length approximately corresponding to the upper end of each battery cell and a thickness approximately corresponding to each battery cell while the impact-absorbing member is mounted at the upper-end sealing part of each battery cell or while the impact-absorbing member is elastically pressurized after the impact-absorbing member is mounted at the upper-end sealing part of each battery cell.

4. The battery module according to claim 1, wherein an adhesive layer is applied to a bottom or a top and the bottom of the impact-absorbing member such that the impact-absorbing member is fixed to the upper end of each battery cell.

5. The battery module according to claim 1, wherein the unit cells are stacked such that the electrode terminals having the same polarities are oriented in the same directions, the electrode terminals are provided with coupling through-holes, through which coupling members coupled to a module case are inserted.

6. The battery module according to claim 5, wherein the battery module includes
    insulating members disposed between the electrode terminals of neighboring unit cells for electrically insulating the electrode terminals of the neighboring unit cells, the insulating members having protrusions that can be coupled in the through-holes.

7. The battery module according to claim 6, wherein the protrusions are provided with through-holes having an inner diameter less than that of the through-holes of the electrode terminals, whereby the coupling members are inserted through the through-holes of the protrusions, after the unit cells are stacked while the insulating members are disposed between the neighboring unit cells, such that the unit cells are connected with each other.

8. The battery module according to claim 1, wherein the battery module further includes
    a plate-shaped, high-strength safety member disposed between the outermost one of the stacked unit cells and the upper case such that the safety member is arranged in parallel with electrode plates of the outermost unit cell.

9. The battery module according to claim 1, wherein the battery module further includes
double-sided adhesive members disposed between the stacked unit cells, the double-sided adhesive members having a predetermined thickness.

10. The battery module according to claim 9, wherein the double-sided adhesive members include at least two double-sided adhesive members spaced apart from each other.

11. The battery module according to claim 1, wherein electric wires are arranged at a bottom of the lower case such that the electric wires are electrically connected to the first circuit unit and the third circuit unit.

12. The battery module according to claim 11, wherein the second circuit unit is covered by a cover for protecting the second circuit unit from the outside.

13. A battery module using battery cells each having an electrode assembly, the battery cells being mounted as unit cells in a battery case including a resin layer and a metal layer,
wherein each battery cell has a cell body and an upper end including an upper-end sealing part, the cell body including opposing top and bottom surfaces, the upper end having a thickness extending in a direction between the top and bottom surfaces that is less than a thickness of the cell body extending in a direction between the top and bottom surfaces, the upper-end sealing part being formed at a region where electrode terminals are placed, an impact-absorbing member being mounted only at the upper end of each battery cell at the region where the electrode terminals are placed, and a double-sided adhesive member disposed on at least one of the top or bottom surfaces,
wherein the impact-absorbing member is made of natural rubber or synthetic rubber,
wherein the battery module further includes a plate on which the unit cells are stacked and a circuit unit for controlling the operation of the unit cells,
wherein the plate is constructed in a case structure having a receiving part corresponding to the size of each unit cell such that the unit cells can be easily mounted on the plate, and the case structure is a separation-type structure for covering the top and bottom of the stacked unit cells,
wherein the battery module further includes:
a plurality of secondary batteries, which can be charged and discharged, used as unit cells,
a lower case having an upper-end receiving part, in which the unit cells are sequentially stacked one on another,
an upper case having a lower-end receiving part for covering the top of the unit cells stacked on the lower case,
a first circuit unit for electrically connecting the stacked unit cells, the first circuit unit having a sensing board assembly for sensing the voltage, current, and/or temperature of the unit cells,
a second circuit unit electrically connected to the first circuit unit, the second circuit unit having a main board assembly for controlling the overall operation of the battery module, and
a third circuit unit electrically connected to the second circuit unit, the third circuit unit being connected to an external output terminal while preventing overcharge, overdischarge, and/or overcurrent of the unit cells, and
wherein the first circuit unit is located at a front of the battery module and directly mounted to the upper and lower cases, the second circuit unit is located at a bottom of the battery module and directly mounted to the lower case, and the third circuit unit is located at a rear of the battery module and directly mounted to the upper and lower cases.

14. The battery module according to claim 13, wherein the battery case is a pouch-shaped case made of an aluminum laminate sheet.

15. The battery module according to claim 13, wherein the impact-absorbing member has a length approximately corresponding to the upper end of each battery cell and a thickness approximately corresponding to each battery cell while the impact-absorbing member is mounted at the upper end of each battery cell or while the impact-absorbing member is elastically pressurized after the impact-absorbing member is mounted at the upper end of each battery cell.

16. The battery module according to claim 13, wherein an adhesive layer is applied to a bottom or a top and the bottom of the impact-absorbing member such that the impact-absorbing member is fixed to the upper end of each battery cell.

17. The battery module according to claim 13, wherein the unit cells are stacked such that the electrode terminals having the same polarities are oriented in the same directions, the electrode terminals are provided with coupling through-holes, through which coupling members coupled to a module case are inserted.

18. The battery module according to claim 17, wherein the battery module includes
insulating members disposed between the electrode terminals of neighboring unit cells for electrically insulating the electrode terminals of the neighboring unit cells, the insulating members having protrusions that can be coupled in the through-holes.

19. The battery module according to claim 18, wherein the protrusions are provided with through-holes having an inner diameter less than that of the through-holes of the electrode terminals, whereby the coupling members are inserted through the through-holes of the protrusions, after the unit cells are stacked while the insulating members are disposed between the neighboring unit cells, such that the unit cells are connected with each other.

20. The battery module according to claim 13, wherein the battery module further includes
a plate-shaped, high-strength safety member disposed between the outermost one of the stacked unit cells and the upper case such that the safety member is arranged in parallel with electrode plates of the outermost unit cell.

* * * * *